(12) United States Patent
Li et al.

(10) Patent No.: US 9,323,565 B2
(45) Date of Patent: Apr. 26, 2016

(54) PROVISIONING CUSTOMIZED VIRTUAL MACHINES WITHOUT REBOOTING

(71) Applicant: VMware, Inc., Palo Alto, CA (US)

(72) Inventors: Hui Li, Fremont, CA (US); Daniel James Beveridge, Apollo Beach, FL (US); Oswald Chen, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 87 days.

(21) Appl. No.: 14/136,701

(22) Filed: Dec. 20, 2013

(65) Prior Publication Data

US 2015/0178109 A1    Jun. 25, 2015

(51) Int. Cl.
| | | |
|---|---|---|
| *G06F 9/46* | (2006.01) | |
| *G06F 1/00* | (2006.01) | |
| *G06F 9/455* | (2006.01) | |
| *G06F 1/32* | (2006.01) | |

(52) U.S. Cl.
CPC .......... *G06F 9/45558* (2013.01); *G06F 1/3287* (2013.01); *G06F 2009/4557* (2013.01); *G06F 2009/45562* (2013.01)

(58) Field of Classification Search
CPC ........................ G06F 2009/4557; G06F 1/3287
See application file for complete search history.

(56) References Cited

U.S. PATENT DOCUMENTS

| 7,725,531 B1 | 5/2010 | Sood et al. |
|---|---|---|
| 8,151,263 B1 | 4/2012 | Venkitachalam et al. |
| 2004/0010787 A1 | 1/2004 | Traut et al. |
| 2006/0101189 A1 | 5/2006 | Chandrasekaran et al. |
| 2006/0129627 A1 | 6/2006 | Phillips et al. |
| 2008/0155223 A1 | 6/2008 | Hiltgen et al. |
| 2008/0244028 A1 | 10/2008 | Le et al. |
| 2010/0070978 A1 | 3/2010 | Chawla et al. |
| 2011/0154331 A1* | 6/2011 | Ciano et al. ...................... 718/1 |
| 2012/0144391 A1* | 6/2012 | Ueda ................................. 718/1 |
| 2012/0174096 A1 | 7/2012 | Conover |
| 2013/0047160 A1 | 2/2013 | Conover |
| 2014/0244950 A1 | 8/2014 | Baron et al. |

OTHER PUBLICATIONS

Unknown, "Project Serengeti", accessed at <<projectserengeti.org>>, accessed on Dec. 19, 2013, 2 pages.
Unknown, "Welcome to Apache Hadoop!", accessed at <<hadoop.apache.org>>, Dec. 12, 2013, 4 pages.
Unknown, "Horizon View", accessed at <<www.vmware.com/products/horizon-view>>, accessed on Dec. 19, 2013, 6 pages.
Unknown, "Cloud Foundry Community", accessed at <<www.cloudfoundry.org>>, accessed on Dec. 19, 2013, 2 pages.
Lagar-Cavilla et al., "SnowFlock: Virtual Machine Cloning as a First Class Cloud Primitive", ACM Transactions on Computing Systems., vol. 29(1), Feb. 2011, 50 pages.

(Continued)

*Primary Examiner* — Camquy Truong

(57) ABSTRACT

Embodiments provision and customize virtual machines (VMs), such as desktop VMs, without rebooting the desktop VMs. In response to a request to provision the VMs, a computing device creates a clone VM from a parent VM template identified in the request. One or more customization that prompt rebooting of the clone VM are applied to the clone VM. The computing device instantiates a plurality of child VMs from the customized clone VM. A child VM configuration is applied to at least one of the instantiated child VMs without provoking a reboot of those child VMs.

20 Claims, 9 Drawing Sheets

(56) References Cited

OTHER PUBLICATIONS

Unknown, "What's new in private Paas? Introducing OpenShift Enterprise 2.0", accessed at <<redhat.com/about/events-webinars/webinars/2013-12-17-openshift-enterprise-2>>, accessed on Dec. 19, 2013, 1 page.
Unknown, "OpenShift Platform Features", Benefits Document, Red Hat, Inc., 2012, 5 pages.
Unknown, "SnowFlock: Swift VM Cloning for Cloud Computing", accessed at <<web.cs.toronto.edu/snowflock>>, accessed on Dec. 19, 2013, 2 pages.
Unknown, "Virtual Memory Streaming", OpenStack, Gridcentric, Inc., 2013, 2 pages.
Unknown, "RemoteApp for Hyper-V", Remote Desktop Services Blog, accessed at <<blog.msdn.com/b/rds/archive/2009/12/15/remoteapp-for-hyper-v.aspx>>, Dec. 2009, 5 pages.
Unknown, "LXC", accessed at <<http://en.wikipedia.org/wiki/LXC>>, accessed on Dec. 19, 2013, 2 pages.
Unknown, "Linux-VServer", accessed at <<wikipedia.org/wiki/Linux-VServer>>, accessed on Dec. 19, 2013, 3 pages.
USPTO, Non-final Office Action in U.S. Appl. No. 14/136,741, Mailed Date: Dec. 3, 2015, 9 pages.
USPTO, Non-final Office Action in U.S. Appl. No. 14/615,366, Mailed Date: Nov. 20, 2015, 10 pages.
USPTO, Non-Final Office Action in U.S. Appl. No. 14/136,661, Mailed Date: Mar. 3, 2016, 12 pages.
Wang, et al, "Rethink the Virtual Machine Template," In Proceedings of VEE'11, Mar. 9-11, 2011, Newport Beach, California, USA, 11 pages.
Vrable, et al., Scalability, Fidelity, and Containment in the Potemkin Virtual Honeyfarm, In Proceedings of SOSP'05, Oct. 23-26, 2005, Brighton, United Kingdom, 15 pages.
Shi, et al., A Cloud Service Cache System Based on Memory Template of Virtual Machine, Published: 2011, 6 pages.
Bryant, et al., Kaleidoscope: Cloud Micro-Elasticity via VM State Coloring, Eurosys '11, Apr. 10-13, Salzburg, Austria, 14 pages.

\* cited by examiner

PROVISIONING CUSTOMIZED VIRTUAL MACHINES WITHOUT REBOOTING

CROSS-REFERENCE TO RELATED APPLICATIONS

This application is related to U.S. patent applications entitled "Elastic Compute Fabric Using Virtual Machine Templates", "Fast Instantiation of Virtual Machines", and "State Customization of Forked Virtual Machines", filed concurrently herewith, all of which are incorporated by reference herein in their entireties.

BACKGROUND

Some existing systems allow creation of virtual desktops using linked clones, such as with the View Composer feature in the Virtual Desktop Infrastructure (VDI) product by VMware, Inc. In such systems, the virtual desktops share a common base image residing on their parent VM's base disk but each virtual desktop has its own delta disk. This storage consolidation enables customers to reduce the storage cost for their virtual deployment. However, the size of the delta disk grows over time. This not only discounts the storage savings brought by the base disk consolidation, but also deteriorates the runtime disk access performance.

Some of the existing systems attempt to mitigate delta disk growth by redirecting user data and system temporary content to separate disks, and/or allowing the delta disk to revert to checkpoint images when the delta disk grows to a particular size. However, customizing each of the virtual desktops to enable such mitigations is time-consuming. Further, applying the customizations often requires at least two reboot operations that further slow the virtual desktop provisioning process, and negate the benefits of fast instantiation of the virtual desktops. The reboot threats arise, for example, from operations performed on each of the virtual desktops. For example, the first reboot operation may occur when setting a computer name and activating a license. The second reboot operation may occur when joining a domain, performing checkpointing operations, and/or responding to reboot requests from a device manager executing on the virtual desktop (e.g., to install device drivers for added disks).

Performing two full reboot cycles during guest customization of each desktop clone negatively affects performance. In large scale provisioning of thousands of virtual desktops using the existing systems, for example, the reboot cycles aggravate boot storm levels (e.g., a peak surge of memory utilization) which cause elevated input/output operations per second (IOPS) at the storage layer thereby preventing customers from realizing storage savings from the storage consolidation of using linked clone VMs. Additional storage may be purchased, but this only increases cost for the consumer. In addition, when rebooting, each virtual desktop loses the benefit of memory page sharing with a parent virtual machine such that "instant" instantiation is not available.

Further, with the existing systems, the additional time to prepare the virtual desktops increases the overall provisioning time, which may leave the system vulnerable to any transient environment issue thereby increasing the failure rate and cost of ownership by the customer.

SUMMARY

One or more embodiments described herein configure a parent virtual machine (VM) template before instantiating child VMs therefrom to prevent rebooting the child VMs during subsequent guest customization. A computing device receives a request to provision a plurality of child VMs. The request identifies a parent VM template. In response to the received request, the computing device creates a clone VM from the parent VM template and applies one or more customizations that prompt rebooting of the clone VM. A plurality of child VMs are then instantiated from the customized clone VM. A child VM configuration is applied to at least one of the instantiated plurality of child VMs without rebooting that child VM.

In some embodiments, the child VMs are desktop VMs provisioning across a plurality of target hosts. The computing device maintains a replica map that stores an assignment between each of a plurality of clone VMs and at least one of the target hosts.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
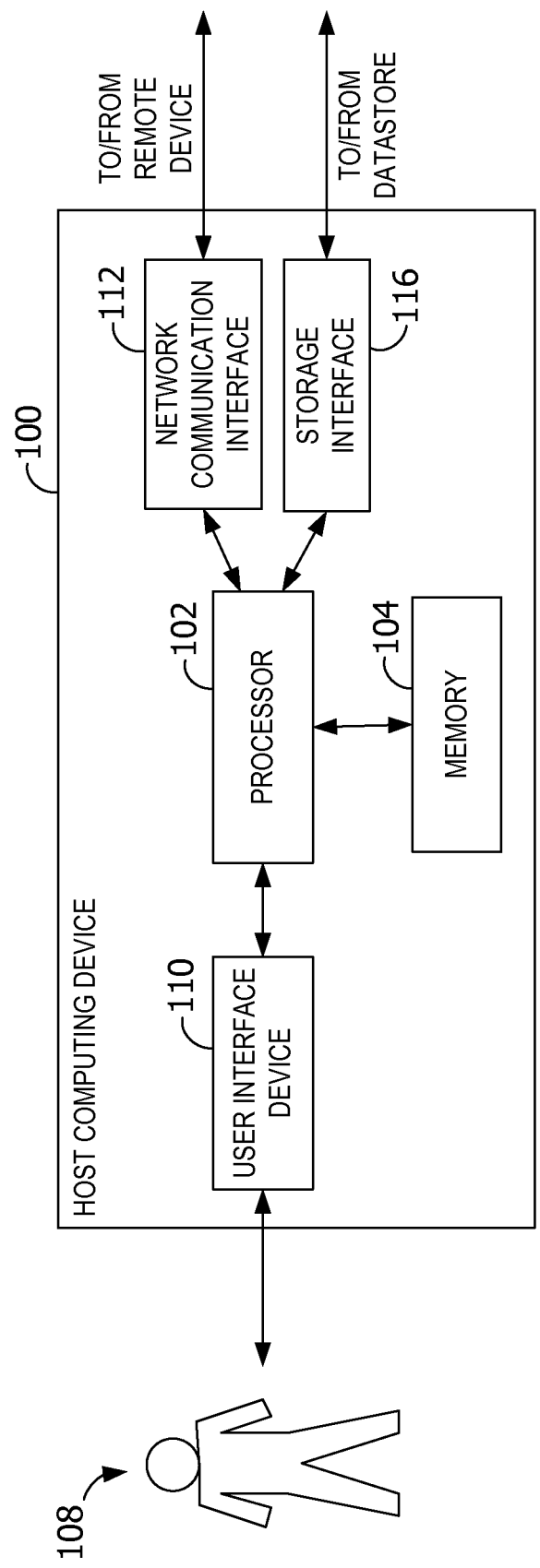
FIG. 1 is a block diagram of an exemplary host computing device.

Embodiments described herein instantiate a plurality of virtual machines (VMs), such as desktop VMs, without rebooting. Some embodiments consolidate customizations that prompt reboots into a single clone VM, which is then shared with the desktop VMs. Each of the desktop VMs then power-on without rebooting. For example, while data redirection to external disks presents a reboot threat in some existing systems, aspects of the disclosure eliminate the reboot threat from data redirection at each desktop VM. Exemplary operations that are consolidated in the single clone VM include, but are not limited to, adding and/or creating a user data disk, adding and/or creating a system disposable disk, partitioning the disks, formatting the disks, and/or assigning mount points for the disks. Aspects of the disclosure configure the desktop VMs to redirect data to other disks, such as the user data disk and/or the system disposable disk, to reduce disk space within each desktop VM.

Accordingly, aspects of the disclosure enable the desktop provisioning process to achieve customization without a single reboot at the individual desktop clone level. Eliminating reboot cycles enables aspects of the disclosure to perform fast instantiation routines that use memory page sharing, such as the forking routines described herein. While aspects of the disclosure are operable with any fast instantiation routines, some embodiments are operable with forking operations as described herein. Forking instantly creates live child VMs from a powered-on parent VM. This offers instant live VM provisioning with underlying memory and disk resource sharing.

Further, by powering on each child VM directly from the forking point of a parent VM, the initial boot process at each child VM is simplified, requires less time, and significantly reduces boot storms. This is especially effective when customizing a large quantity of desktop VMs. Further, storage costs (and other ownership costs) for customers are reduced based on, for example, a reduction in input/output operations per second (IOPS) demand at the storage array level. Memory costs are also reduced when using the forking operations because of memory page sharing between the child VMs and the parent VMs. For short-lived, non-persistent desktop VMs, the memory page sharing may occur during the entire lifecycle of such desktop VMs. Additionally, employing forking without rebooting the child VMs accelerates initial deployment of linked-clone VMs, which can then be converted to full-clone VMs (e.g., by migrating the linked-clone VMs to full-clone status while the linked-clone VMs are already being used by the customers). This presents a more efficient way of provisioning or relocating full VMs.

Aspects of the disclosure further enable simplified checkpointing. For example, rather than rebooting each desktop VM when creating a checkpoint image, the file system in the desktop VM is quiesced to enable copying of an operating system delta disk.

Some embodiments operate within a virtual desktop provisioning infrastructure, such as the Virtual Desktop Infrastructure (VDI) product by VMware, Inc. However, such embodiments are operable with any virtual desktop provisioning infrastructure.

An exemplary virtualized environment is next described.

FIG. 1 is a block diagram of an exemplary host computing device 100. Host computing device 100 includes a processor 102 for executing instructions. In some embodiments, executable instructions are stored in a memory 104. Memory 104 is any device allowing information, such as executable instructions and/or other data, to be stored and retrieved. For example, memory 104 may include one or more random access memory (RAM) modules, flash memory modules, hard disks, solid state disks, and/or optical disks.

Host computing device 100 may include a user interface device 110 for receiving data from a user 108 and/or for presenting data to user 108. User 108 may interact indirectly with host computing device 100 via another computing device such as VMware's vCenter Server or other management device. User interface device 110 may include, for example, a keyboard, a pointing device, a mouse, a stylus, a touch sensitive panel (e.g., a touch pad or a touch screen), a gyroscope, an accelerometer, a position detector, and/or an audio input device. In some embodiments, user interface device 110 operates to receive data from user 108, while another device (e.g., a presentation device) operates to present data to user 108. In other embodiments, user interface device 110 has a single component, such as a touch screen, that functions to both output data to user 108 and receive data from user 108. In such embodiments, user interface device 110 operates as a presentation device for presenting information to user 108. In such embodiments, user interface device 110 represents any component capable of conveying information to user 108. For example, user interface device 110 may include, without limitation, a display device (e.g., a liquid crystal display (LCD), organic light emitting diode (OLED) display, or "electronic ink" display) and/or an audio output device (e.g., a speaker or headphones). In some embodiments, user interface device 110 includes an output adapter, such as a video adapter and/or an audio adapter. An output adapter is operatively coupled to processor 102 and configured to be operatively coupled to an output device, such as a display device or an audio output device.

Host computing device 100 also includes a network communication interface 112, which enables host computing device 100 to communicate with a remote device (e.g., another computing device) via a communication medium, such as a wired or wireless packet network. For example, host computing device 100 may transmit and/or receive data via network communication interface 112. User interface device 110 and/or network communication interface 112 may be referred to collectively as an input interface and may be configured to receive information from user 108.

Host computing device 100 further includes a storage interface 116 that enables host computing device 100 to communicate with one or more datastores, which store virtual disk images, software applications, and/or any other data suitable for use with the methods described herein. In exemplary embodiments, storage interface 116 couples host computing device 100 to a storage area network (SAN) (e.g., a Fibre Channel network) and/or to a network-attached storage (NAS) system (e.g., via a packet network). The storage interface 116 may be integrated with network communication interface 112.

Figure 2:
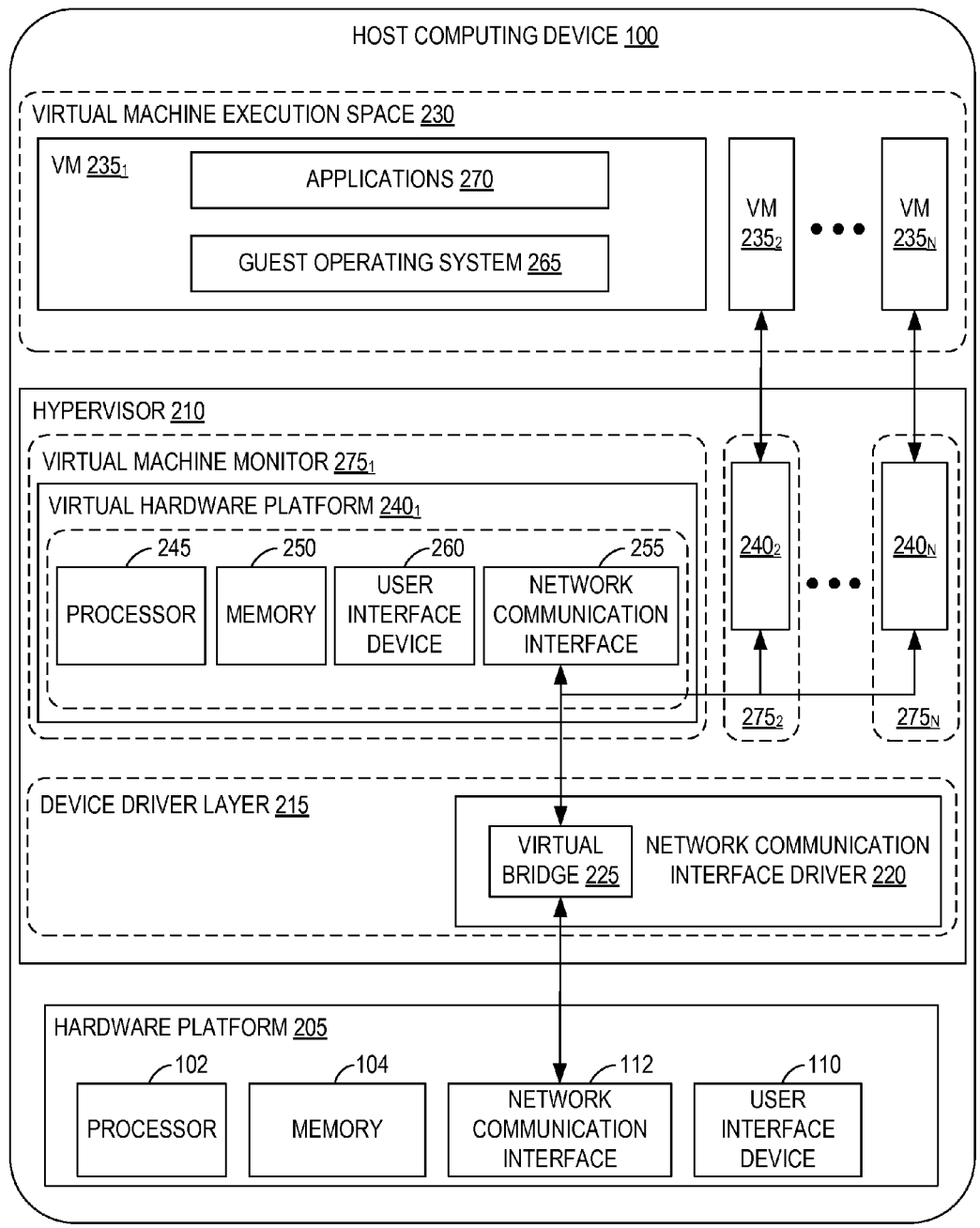
FIG. 2 is a block diagram of virtual machines (VMs) that are instantiated on a computing device, such as the host computing device shown in FIG. 1.

FIG. 2 depicts a block diagram of virtual machines $235_1$, $235_2$ ... $235_N$ that are instantiated on host computing device 100. Host computing device 100 includes a hardware platform 205, such as an x86 architecture platform. Hardware platform 205 may include processor 102, memory 104, network communication interface 112, user interface device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, network communication interface 112, and/or user interface device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware (such as a processor 245, a memory 250, a network communication interface 255, a user interface device 260 and other emulated I/O devices in VM $235_1$). Hypervisor 210 may manage (e.g., monitor, initiate, and/or terminate) execution of VMs $235_1$-$235_N$ according to policies associated with hypervisor 210, such as a policy specifying that VMs $235_1$-$235_N$ are to be automatically restarted upon unexpected termination and/or upon initialization of hypervisor 210. In addition, or alternatively, hypervisor 210 may manage execution VMs $235_1$-$235_N$ based on requests received from a device other than host computing device 100. For example, hypervisor 210 may receive an execution instruction specifying the initiation of execution of first VM 2351 from a management device via network communication interface 112 and execute the execution instruction to initiate execution of first VM 2351.

In some embodiments, memory 250 in first virtual hardware platform 2401 includes a virtual disk that is associated with or "mapped to" one or more virtual disk images stored on a disk (e.g., a hard disk or solid state disk) of host computing device 100. The virtual disk image represents a file system (e.g., a hierarchy of directories and files) used by first VM 2351 in a single file or in a plurality of files, each of which includes a portion of the file system. In addition, or alternatively, virtual disk images may be stored on one or more remote computing devices, such as in a storage area network (SAN) configuration. In such embodiments, any quantity of virtual disk images may be stored by the remote computing devices.

Device driver layer 215 includes, for example, a communication interface driver 220 that interacts with network communication interface 112 to receive and transmit data from, for example, a local area network (LAN) connected to host computing device 100. Communication interface driver 220 also includes a virtual bridge 225 that simulates the broadcasting of data packets in a physical network received from one communication interface (e.g., network communication interface 112) to other communication interfaces (e.g., the virtual communication interfaces of VMs 2351-235N). Each virtual communication interface for each VM 2351-235N, such as network communication interface 255 for first VM 2351, may be assigned a unique virtual Media Access Control (MAC) address that enables virtual bridge 225 to simulate the forwarding of incoming data packets from network communication interface 112. In an embodiment, network communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs 2351-235N. This configuration enables an Ethernet packet that has a virtual MAC address as its destination address to properly reach the VM in host computing device 100 with a virtual communication interface that corresponds to such virtual MAC address.

Virtual hardware platform 2401 may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM 2351. Virtual hardware platforms 2401-240N may be considered to be part of virtual machine monitors (VMM) 2751-275N that implement virtual system support to coordinate operations between hypervisor 210 and corresponding VMs 2351-235N. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms 2401-240N may also be considered to be separate from VMMs 2751-275N, and VMMs 2751-275N may be considered to be separate from hypervisor 210. One example of hypervisor 210 that may be used in an embodiment of the disclosure is included as a component in VMware's ESX brand software, which is commercially available from VMware, Inc.

Figure 3:
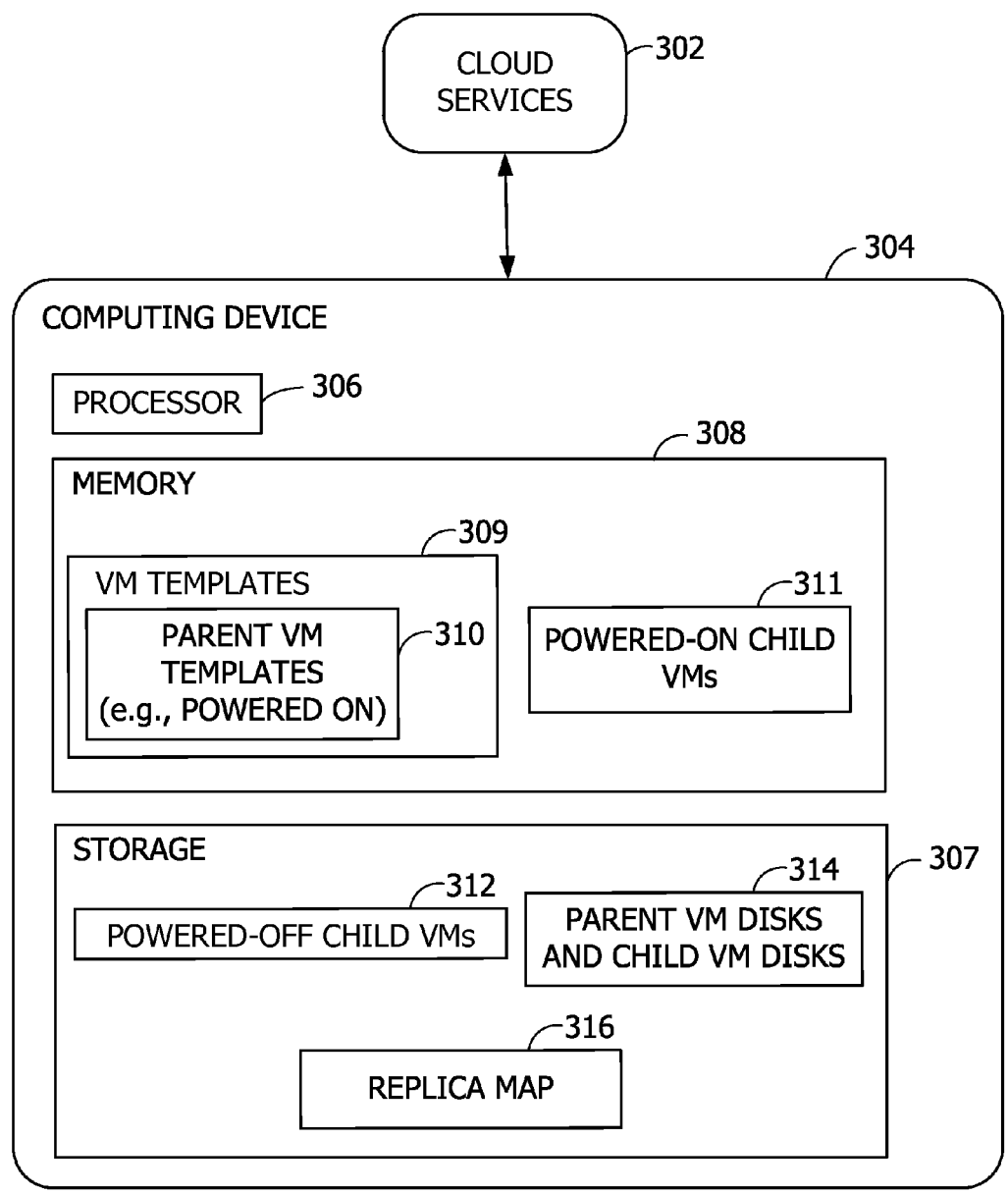
FIG. 3 is a block diagram of an exemplary computing device in a cloud platform storing VM templates and data describing VMs instantiated therefrom.

Referring next to FIG. 3, a block diagram illustrates an exemplary computing device 304 storing VM templates 309 and data describing VMs instantiated therefrom. Cloud services 302, an administrator, user 108, and/or other entities interact with computing device 304 to request instantiation of child VMs (e.g., such as desktop VMs). Computing device 304 configures a parent VM template 310 before instantiating the requested child VMs therefrom to prevent rebooting the child VMs during subsequent guest customization, such as described herein.

Computing device 304 represents any device executing instructions (e.g., as application programs, operating system functionality, or both) to implement the operations and functionality described and illustrated herein. For example, computing device 304 executes instructions to implement the operations illustrated in FIG. 4, FIG. 5, and FIG. 8. Computing device 304 may include any computing device or processing unit. For example, computing device may represent a group of processing units or other computing devices, such as in a cloud computing configuration.

Computing device 304 has at least one processor 306 and a memory 308 (e.g., a memory area). Processor 306 includes any quantity of processing units, and is programmed to execute computer-executable instructions for implementing aspects of the disclosure. The instructions may be performed by processor 306 or by multiple processors executing within computing device 304, or performed by a processor external to computing device 304.

Memory 308 includes any quantity of computer-readable media associated with or accessible by computing device 304. Memory 308, or portions thereof, may be internal to computing device 304, external to computing device 304, or both. Exemplary memory 308 includes random access memory.

In the example of FIG. 3, memory 308 stores a plurality of VM templates 309. In some embodiments, VM templates 309 are arranged in a hierarchy, such as a tree hierarchy. However, aspects of the disclosure are operable with VM templates 309 stored in any structure. In such embodiments, VM templates 309 include a plurality of parent VM templates 310. In some embodiments, parent VM templates 310 are powered-on. The powered-on parent VM templates 310 may be created and maintained by computing device 304 and/or by cloud services 302.

In some embodiments, each parent VM template 310 includes a virtual device state for one of VMs 235 and a memory state for that VM 235. Memory 308 further stores data describing a plurality of powered-on child VMs 311.

Computing device 304 further includes storage 307. Storage 307 stores data describing a plurality of powered-off child VMs 312. Each of the powered-off child VMs 312 is instantiated, on demand, from one of the plurality of parent VM templates 310. Until then, powered-off child VMs 312 do not occupy any memory resources. For example, powered-off child VMs 312 are present in storage 307 and, when powered-on, copy-on-write (COW) share memory pages with parent VMs and enter into memory 308. Storage 307 further stores at least one replica map 316. Replica map 316 stores an assignment between each of a plurality of clone VMs and at least one of a plurality of target hosts (e.g., hosts 100).

Child VMs have one or more properties, characteristics, or data associated therewith. Exemplary child VM properties include, but are not limited to, hostname, IP address, MAC address, domain identity, processor size, and/or memory size. In some embodiments, the child VM properties for each child VM may be referred to as configuration data. Storage 307 further stores parent VM disks and child VM disks 314 (e.g., .vmdk files) for use by VMs 235.

In contrast to memory 308, exemplary storage 307 includes one or more disks.

After instantiation, powered-off child VMs 312 are registered to a cloud operating system. The cloud operating system is executed in a cloud computing configuration. Registration of one of powered-off child VMs 312 includes identifying powered-off child VM 312 to the cloud operating system, and occurs before powered-off child VM 312 is powered-on or otherwise executed. In this manner, powered-off child VM 312 is said to be pre-registered with the cloud operating system. In some embodiments, the cloud operating system is hypervisor 210. By registering powered-off child VMs 312, the cloud operating system is no longer in the critical path when cloud services 302 commission VMs 235, thus reducing the amount of time needed for the child VMs to become available. However, aspects of the disclosure are also operable with registration occurring on the child VM instantiation path.

Alternatively or in addition, aspects of the disclosure include a provisioning process that instantiates and powers on all child VMs on target hosts ahead of time. In such aspects, if an error occurs during instantiation and power-on, the error may be caught (and fixed) before the child VMs are requested.

Figure 4:
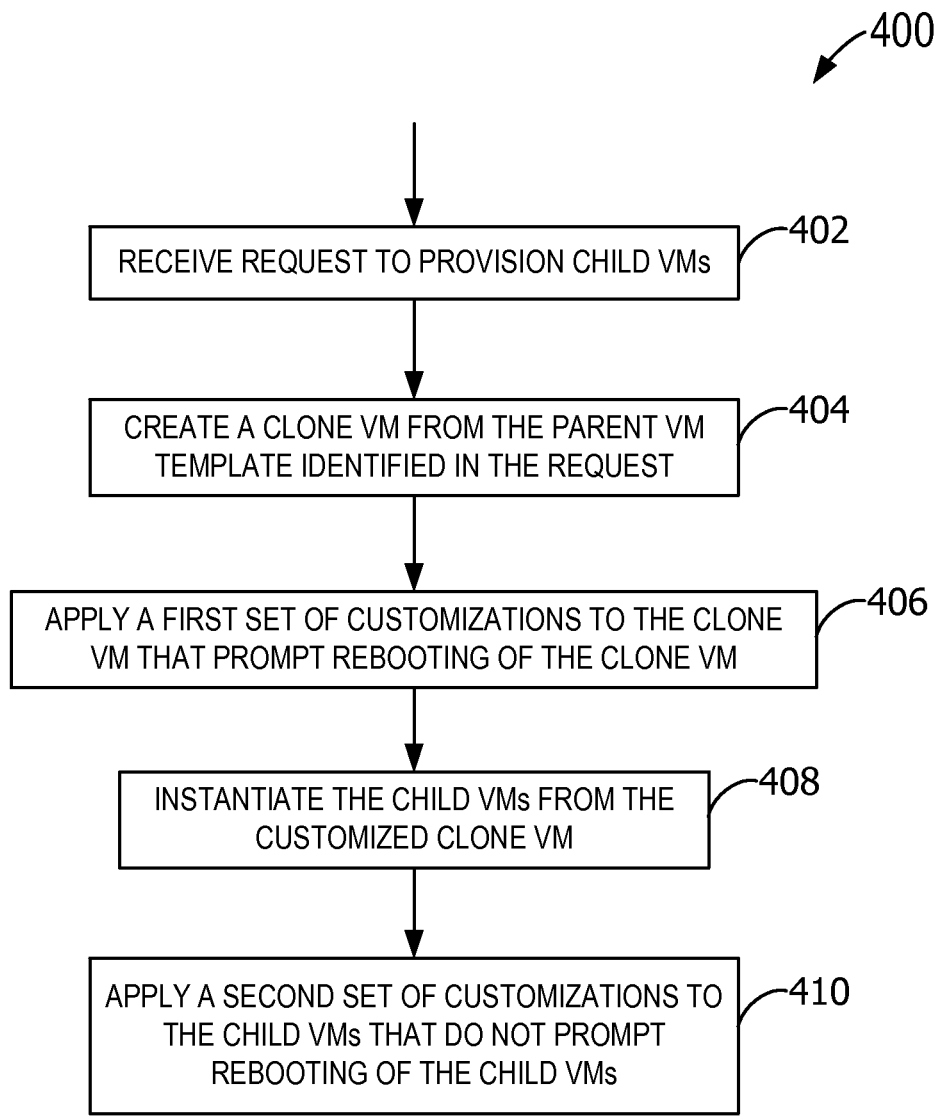
FIG. 4 is a flowchart of an exemplary method (e.g., performed by the computing device in FIG. 3) to create a customized clone VM before instantiating child VMs therefrom.

Referring next to FIG. 4, a flowchart illustrates an exemplary method 400 (e.g., performed by computing device 304 in FIG. 3) to create a customized clone VM (e.g., customized clone VM 608) before instantiating child VMs therefrom. While method 400 is described with reference to execution by computing device 304 (shown in FIG. 3), it is contemplated that method 400 may be performed by any computing device.

At 402, computing device 304 receives a request to provision a plurality of child VMs. The request may be received from one of cloud services 302, an administrator, user 108, or other entity. The request includes data identifying, for example, a quantity of child VMs to be provisioned, one of parent VM templates 310, one or more target hosts (e.g., hosts 100), and/or one or more datastores. In response to the received request, computing device 304 creates a clone VM from parent VM template 310 identified in the received request at 404.

At 406, computing device 304 applies a first set of customizations to the created clone VM. The first set of customizations includes one or more configurations, settings, properties, or the like that, unlike other customizations, may prompt rebooting of the clone VM. In some embodiments, the first set of customizations represents customizations that are common to all child VMs (e.g., common to all desktops in a pool). The first set of customizations are defined by, for example, the requesting cloud service 302 (e.g., in the received request), administrator, user 108, and/or other entity. The first set of customizations may also be defined based on the target host and/or datastore, and may also include default values associated therewith. Application of the first set of customizations may prompt the clone VM to reboot one or more times. For example, computing device 304 (or an agent executing on clone VM) monitors for a reboot request from clone VM during application of the first set of customizations, and performed a reboot of the clone VM upon detecting the reboot request. Exemplary customizations in the first set of customizations include, but are not limited to, adding disks, partitioning the disks, formatting the disks, assigning mount points for the disks, user data redirection (e.g., to new disks), pagefile and system temporary folder redirection (e.g., to new disks), and/or other customizations. Pagefile and system temporary folder redirection is used for both persistent and non-persistent desktops, while user data direction is used for persistent desktops. Other exemplary customizations in the first set of customizations include adding a buslogic disk controller (e.g., for some master VM operating systems). As an example, the following exemplary configuration parameters are added to a configuration file for the clone VM (e.g. a .vmx file):

guestinfo.uddMountPoint
   guestinfo.uddSize
   guestinfo.sddMountPoint
   guestinfo.sddSize The clone VM is powered on to complete the consolidated or otherwise common customizations (e.g., the first set of customizations). For example, a guest customization agent executes on the clone VM to perform common guest customization based on the specified extra configuration parameters (e.g., disk partitioning, formatting and mount point assignment). Further, after any added disk volumes are ready per a device manager executing on the clone VM, data redirection is performed. During this process, there may be one or more reboots involved (e.g., if the device manager detects a conflict during device installation).

After applying the first set of customizations, computing device 304 suspends execution of customized clone VM 608 to prepare for instantiation. For example, customized clone VM 608 may be quiesced or powered off. At 408, computing device 304 instantiates the requested child VMs from customized clone VM 608. Aspects of the disclosure are operable with any fast instantiation routines, such as forking. In some embodiments, forking operations include defining, based on a virtual device state of customized clone VM 608, a virtual device state of the child VM and defining persistent storage for the child VM based on persistent storage of customized clone VM 608.

After instantiation, each of the child VMs boot, or otherwise begin execution. At 410, a second set of customizations is applied to at least one of the child VMs. For example, as each child VM boots up, the child VM contacts computing device 304 to obtain the second set of customizations. In this example, the child VM then applies the second set of customizations. In another example, computing device 304 applies the second set of customizations to the child VM.

The second set of customizations includes one or more configurations, settings, properties or the like that, unlike other customizations, do not prompt rebooting of the child VM. The second set of customizations are defined by, for example, the requesting cloud service 302 (e.g., in the received request), administrator, user 108, and/or other entity. The second set of customizations may also be defined based on the target host and/or datastore, and may also include default values associated therewith. In some embodiments, the second set of customizations is different for one or more of the child VMs. The application of the second set of customizations to the child VMs do not prompt rebooting of the child VMs. Exemplary customizations in the second set of customizations include, but are not limited to, configuring an identity of the child VM such as a computer name, domain join, license activation, media access control (MAC) address, Internet Protocol (IP) address, and the like. In some embodiments, the second set of customizations is collectively referred to as a child VM configuration.

Figure 5:
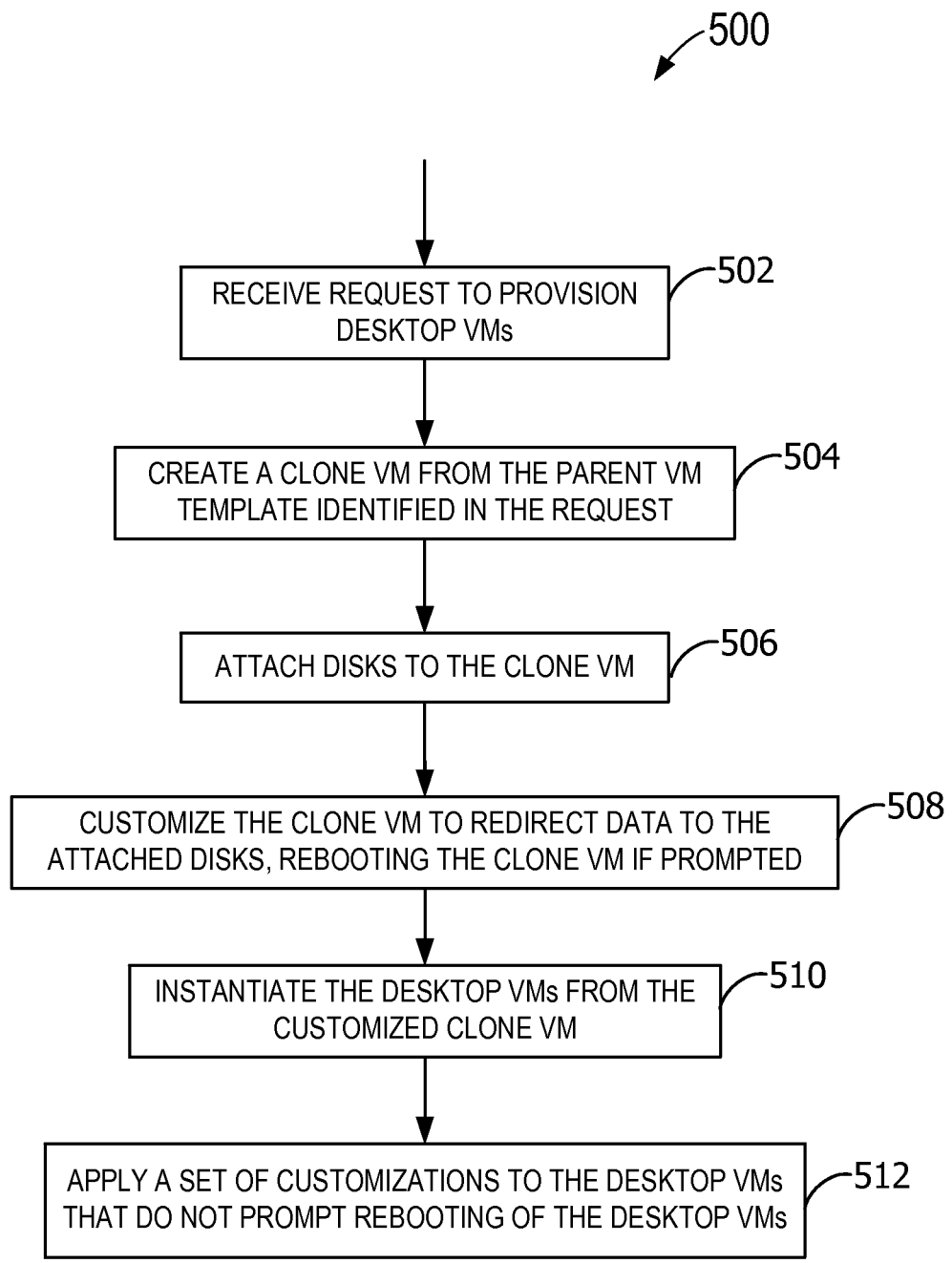
FIG. 5 is a flowchart of an exemplary method (e.g., performed by the computing device in FIG. 3) to attach one or more disks to a clone VM before instantiating desktop VMs.

Examples of customizations that attach one or more disks to the clone VM before instantiating desktop VMs are described next with reference to FIG. 5. In FIG. 5, a flowchart illustrates an exemplary method 500 described as being performed by computing device 304 in FIG. 3. However, it is contemplated that method 500 may be performed by any computing device 304.

At 502, computing device 304 receives a request to provision a plurality of desktop VMs. The desktop VMs provide an end user with an experience similar to, or the same as, that of a personal computer (e.g., laptop, tablet, etc.). The request identifies, at least, one of the plurality of parent VM templates 310. In response to the received request, computing device 304 creates a clone VM from the identified parent VM template 310 at 504, attaches one or more disks to the created clone VM at 506, and customizes the clone VM to redirect data to the attached disks at 508. In some embodiments, the clone VM is powered on after attaching the disks, but before customizing the clone VM to redirect data to the attached disks. Further, the clone VM may be rebooted one or more times during operations 506 and/or 508.

At 510, computing device 304 instantiates the requested plurality of desktop VMs from customized clone VM 608. A VM configuration, or other set of customizations (e.g., the second set of customizations), is applied to the instantiated desktop VMs at 512. Applying the VM configuration does not prompt or provoke a reboot of the desktop VMs. The VM configuration is obtained and applied in a manner similar to the second set of customizations, as described above in FIG. 4.

In some embodiments, each desktop VM may be quiesced, or otherwise suspended, to create a checkpoint image of the desktop VM, but without shutting down the desktop VM for the snapshot and then powering back on (e.g., a reboot). This enables user 108, administrator, or requesting cloud service 302 to create the snapshot without rebooting the desktop VM, and to revert to the checkpoint image at a subsequent, future time.

Figure 6:
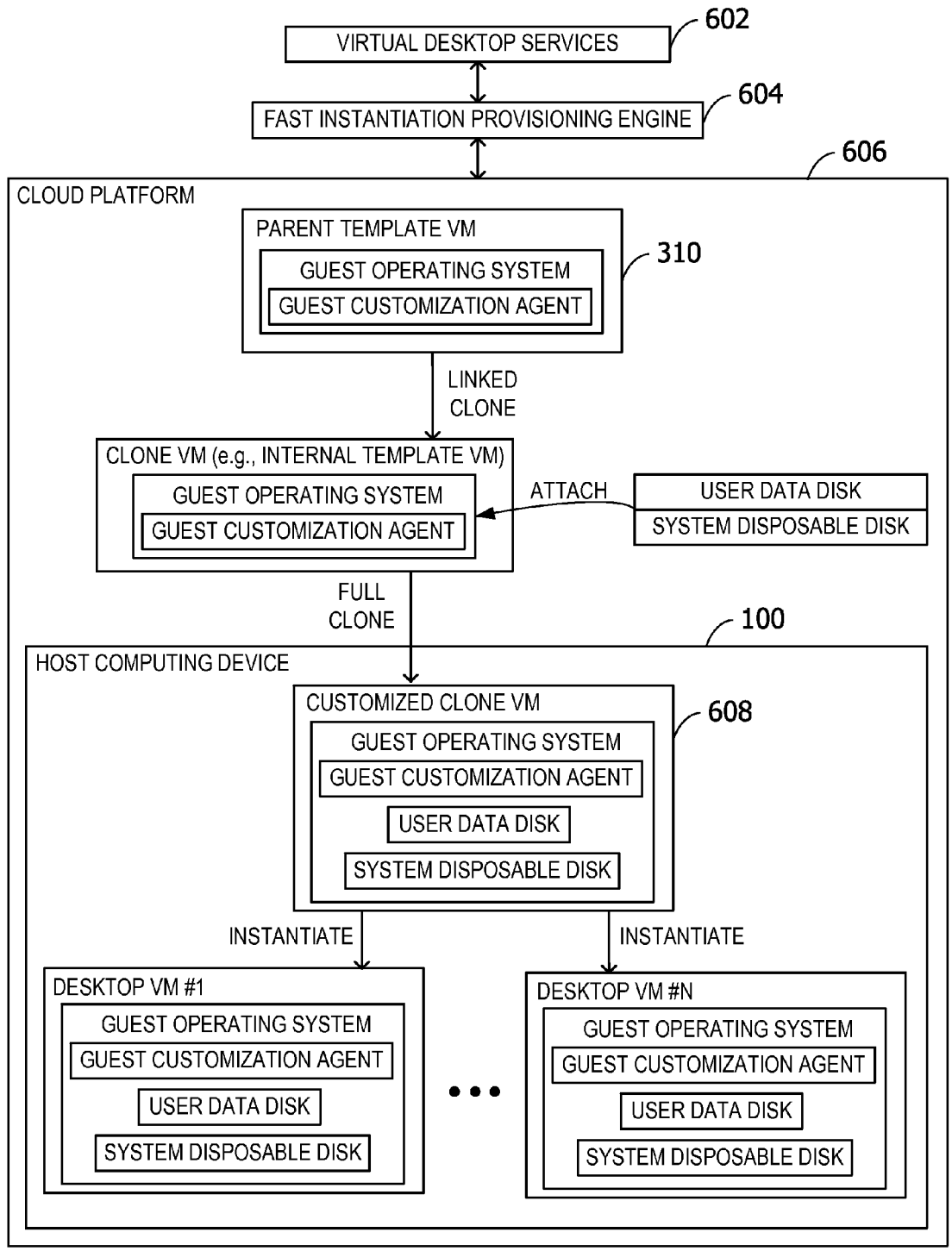
FIG. 6 is a block diagram of an exemplary cloud platform for attaching one or more disks to a clone VM before instantiating desktop VMs.

Referring next to FIG. 6, a block diagram illustrates an exemplary cloud platform 606 for attaching one or more disks to a clone VM before instantiating desktop VMs. One or more virtual desktop services 602 interact with a fast instantiation provisioning engine 604 to scale up or scale down cloud computing resources associated with the virtual desktop services 602. Fast instantiation provisioning engine 604 represents an application programming interface (API) providing virtual desktop services 602 with access to fast instantiation routines executing on cloud platform 606. Aspects of the disclosure are operable with any fast instantiation routines. In some embodiments, the fast instantiation routines include forking routines, such as described herein.

In the example of FIG. 6, cloud platform 606 includes a plurality of parent template VMs, or other user template VMs. Each parent template VM includes a guest operating system. A guest customization agent resides inside each guest operating system. Upon receipt of a request to provision one or more desktop VMs, a clone VM (e.g., a linked clone) or other internal template VM is prepared from parent template VM. One or more disks are attached or otherwise added to the clone VM to customize the clone VM. In the example of FIG. 6, a user data disk and a system disposable disk are added to the clone VM. Those skilled in the art will note that the user data disk is present only for persistent desktops, in some embodiments. The clone VM is powered on, and further configured to redirect data to the two disks. For example, user profile data is redirected to the user data disk, while system temporary data (e.g., pagefiles) is redirected to the system disposable disk. Other guest customization may also be performed. One or more reboots may be performed during this execution of the guest customization agent. With some systems, each of the user data disk and the system disposable disk are stored as .vmdk files. After guest customizations are completed, the clone VM is powered off.

Customized clone VM 608 is a full clone of the clone VM, and a snapshot is taken. Customized clone VM 608, now acting as one of parent template VMs, is transmitted to, or accessed by, at least one host computing device 100. There may be a plurality of host computing devices 100 that access the clone VM. A plurality of desktop VMs, such as desktop VM #1 through desktop VM #N, are instantiated from customized clone VM 608. When the desktop VMs are powered on, there is no longer any reboot threat from the device manager as the disk drivers are already in place.

Figure 7:
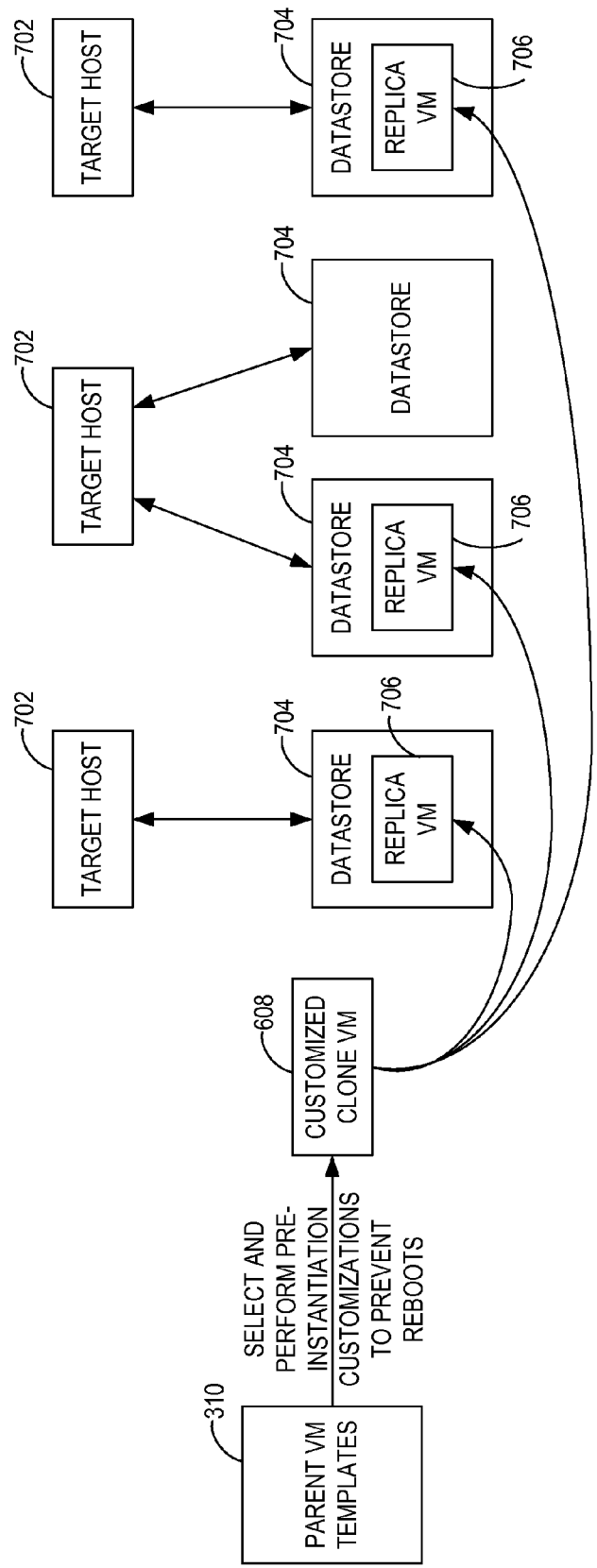
FIG. 7 is a block diagram illustrating replication of a customized clone VM to datastores of target hosts.

Referring next to FIG. 7, a block diagram illustrates replication of customized clone VM 608 to datastores 704 of target hosts 702. For each target host 702, there may be one or several shared datastores 704 (e.g., shared among or between target hosts 702), and/or one or more local datastores 704 (e.g., not shared with any other target host 702). In the example of FIG. 7, customized clone VM 608 is created from a selected one of a plurality of parent VM templates 310 (e.g., see FIG. 4 and FIG. 5). Customized clone VM 608 is replicated concurrently (e.g., at approximately the same time) to a plurality of datastores 704 (e.g., thereby creating replica VMs 706) such that each target host 702 (e.g., belonging to the same resource pool) has access to at least one of replica VMs 706, prior to instantiation of any child VMs therefrom. For example, if 2100 desktop VMs are desired across three target hosts 702, computing device 304 replicates customized clone VM 608 to three datastores 704, each associated with one of the three target hosts 702. Each of the three datastores 704 will store 700 of the desktop VMs, in this example. However, other allocations of the desktop VMs to datastores 704 are contemplated.

Replication involves copying customized clone VM 608, as opposed to creating a linked clone VM. Maximizing the concurrency of replica creations reduces the overall wait time for all linked clone VM (e.g., child VM) creation on target hosts 702.

Figure 8:
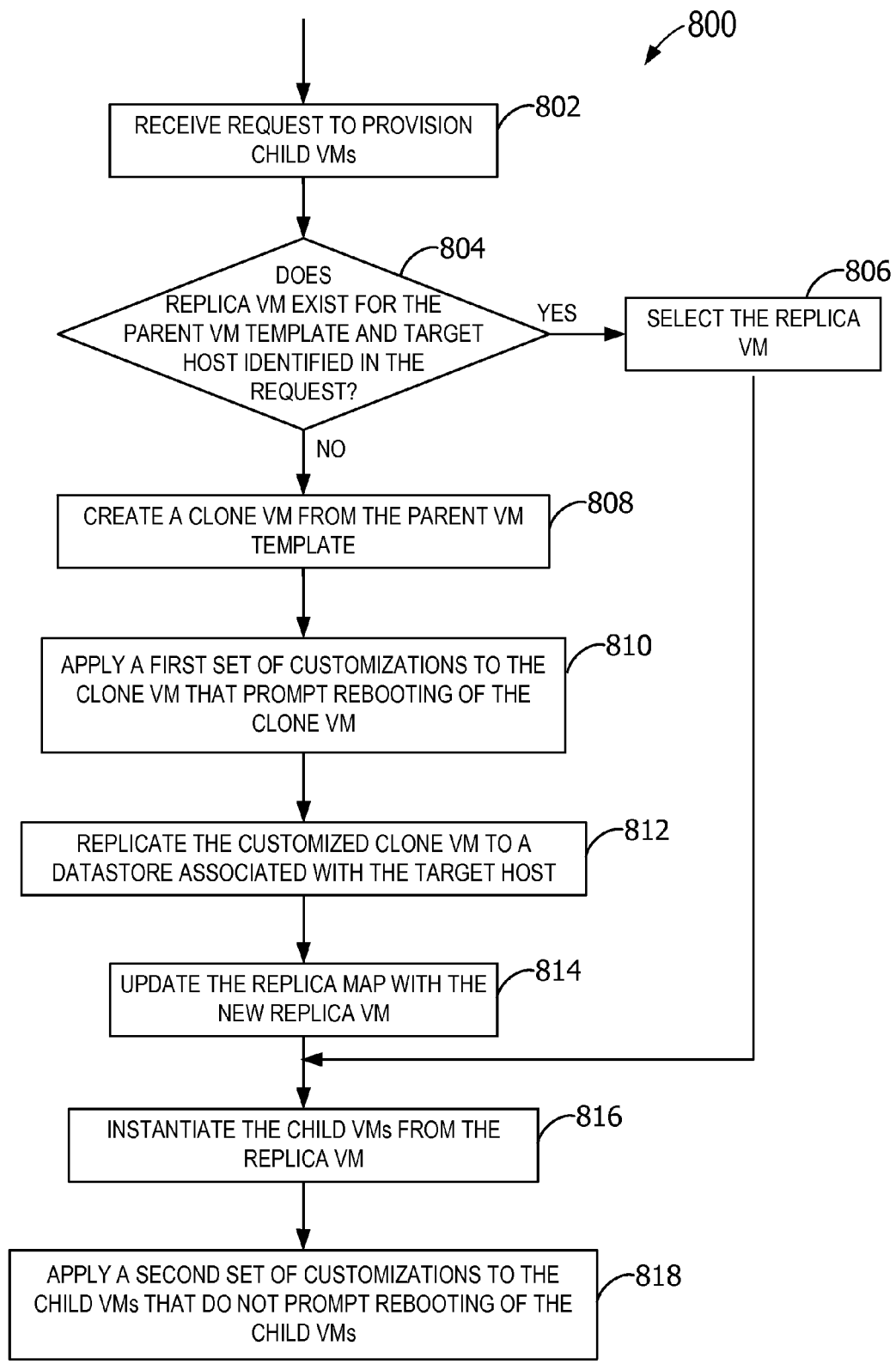
FIG. 8 is a flowchart of an exemplary method for using a replica map to identify, or create, a customized clone VM from which to instantiate desktop VMs on a target host.

Referring next to FIG. 8, a flowchart illustrates an exemplary method 800 for using replica map 316 to identify, or create, customized clone VM 608 from which to instantiate child VMs on target host 702. While method 800 is described with reference to execution by computing device 304 (shown in FIG. 3), it is contemplated that method 800 may be performed by any computing device. The operations shown in FIG. 8, when executed by processor 306, cause processor 306 to perform consolidated customizations before instantiating desktop VMs using replica VMs 706.

At 802, computing device 304 receives a request to provision a plurality of child VMs. The request, in this example, identifies one of parent VM templates 310 (e.g., a clone VM) and one of target hosts 702. In response to the received request, computing device 304 accesses replica map 316 storing correspondences or other associations between clone VMs and target hosts 702. In some embodiments, the identified parent VM template 310 and target host 702 are used in combination as a key into replica map 316. If the identified target host 702 has a clone VM (e.g., replica VM 706) associated therewith that corresponds to the requested parent VM template 310 based on replica map 316 at 804, computing device 304 selects the clone VM at 806 to use for instantiation of the requested child VMs.

In another example, the request does not identify the requested parent VM template 310. In such an example, the internal linked clone VM associated with target host 702 (identified in the request) is considered to be parent VM template 310.

In still another example, rather than identifying one of parent VM templates 310, the request includes a replica VM identifier associated with the desired replica VM 706.

If the identified target host 702 does not have a clone VM associated therewith that corresponds to the requested parent VM template 310, computing device 304 proceeds to create replica VM 706. At 808, computing device 304 creates a clone VM from the requested parent VM template 310 and applies at 810 a first set of customizations to the created clone VM. As described herein, the first set of customizations are those customizations that, when applied, may prompt rebooting of the created clone VM. At least one datastore 704 accessible by target host 702 is selected. Customized clone VM 608 is replicated to the selected datastore 704 associated with, or otherwise accessible by, the identified target host 702 at 812. One single replica VM 706 is created per target host 702 in some examples, while more than one replica VM 706 is created per target host 702 (e.g., to different datastores 704 accessible by target host 702) in other examples for load balancing. Replica VM 706 is registered to target host 702. Computing device 304 updates replica map 316 at 814 (e.g., inserts an entry into replica map 316) to include the correspondence between the newly-created replica VM 706 and the identified target host 702 to allow the newly-created replica VM 706 to be used to instantiate another child VM at a future time.

Computing device 304 also quiesces, or otherwise suspends, the newly created replica VM 706 in preparation for instantiation of child VMs. A snapshot is taken of replica VM 706, and methods of destroying, relocating, migrating, reconfiguring, unregistering, and/or powering off may be disabled to protect replica VM 706. Replica VM 706 is powered on to get into the forked state. At 816, computing device 304 instantiates the requested child VMs from replica VM 706 (e.g., either the pre-existing replica VM 706 or the newly created replica VM 706). Instantiation includes, in some embodiments, forking the requested child VMs from replica VM 706 to create linked clone VMs. Instantiation may further include setting configuration parameters to be applied upon power-on of child VMs, such as the following:

guestInfo.machineName
guestInfo.machinePassword
guestIng.licenseActivation
guestInfo.checkpointing At 818, each of the instantiated child VMs powers on to perform a second set of customizations (e.g., apply one or more child VM configurations). As described herein, the second set of customizations are those customizations that, when applied, do not prompt or provoke rebooting of the child VMs. The second set of customizations may be different for each child VM, depending on the parameters specified in a configuration file (e.g., a .vmx file). For example, the MAC address, machine name, and/or machine password may be set based on the presence of fields such as guestInfo.macAddress, guestInfo.machineName, and/or guestInfo.machinePassword, respectively. If the machine password is set, the machine password is removed from the configuration file, in some embodiments. In another example, the child VM performs license activation if a configuration parameter such as guestInfo.licenseActivation is set to True. Further, the child VM may perform checkpointing operations to enable fast refresh if a configuration parameter such as guestInfo.checkpointing is set to True (e.g., in non-persistent designs). Checkpointing includes quiescing file systems of the child VM (e.g., flushing to persistent storage), and making a file copy of an operating system disk to serve as a checkpoint copy. During a subsequent fast refresh, the operating system disk is replaced with the checkpoint copy.

Some of the customized child VMs may further be modified or promoted to be persistent desktop VMs (e.g., not reset at reboot) so that any subsequent power-on operations (e.g., disk changes) do not conflict with the forked state of the child VM. The promotion may occur during migration of the child VM to another datastore or logical unit number (LUN) device which converts linked clones to full, independent clones. This enables full-clone VMs to be rapidly deployed and made available to end users without any reboots while being gradually converted to full-clone status (e.g., during a subsequent migration). For non-persistent child VMs (e.g., the child VM is reset or refreshed at each power-down or logoff), there is no need for such promotion.

The operations illustrated in FIG. 4, FIG. 5, and FIG. 8 may be implemented as computer-executable instructions stored on one or more computer-readable storage media.

Figure 9:
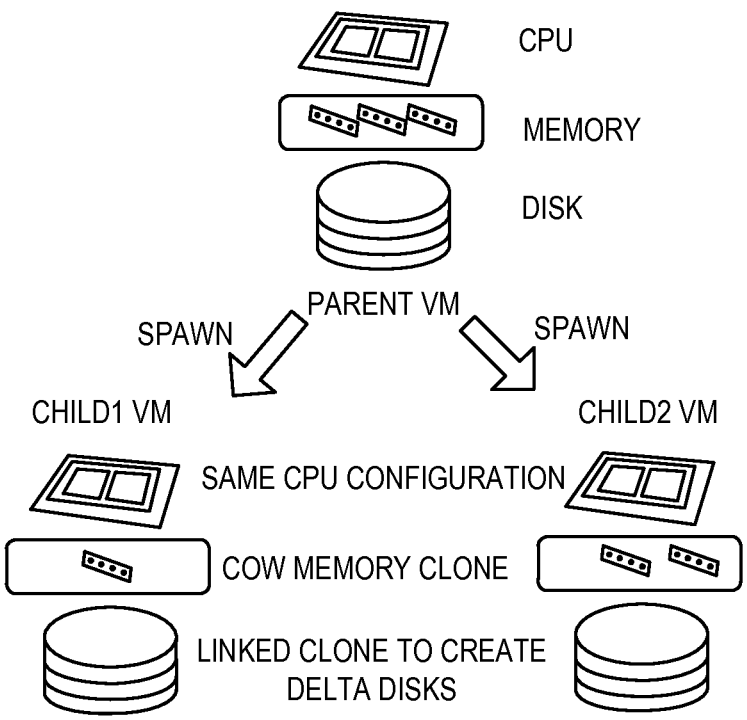
FIG. 9 is a block diagram illustrating instantiation of child VMs from a parent VM.

An example forking operation is next described with reference to FIG. 9. However, those skilled in the art will note that aspects of the disclosure are operable with any fast instantiation routines. In FIG. 9, a block diagram illustrates forking of the child VMs (e.g., child1 VM and child2 VM) from one of parent VM templates 310. Forking avoids a boot storm by instead consuming resources to power-on a base VM image once, and then instantly forking off copies of the pre-booted VM. In this manner, the need for hot-spare VMs is eliminated in some embodiments. Further, forked VMs share common memory and disk state, thus eliminating the need to store or de-duplicate redundant copies of disk or memory content across common VMs.

In an exemplary forking routine, one of VMs is quiesced (thus becoming a powered-on parent VM template 310), and then a defined quantity of the child VMs may be created using the memory, disk, and device state image of parent VM template 310. Such a forking routing may be organized into three stages: preparing a parent VM, preparing the child VM, and spawning the child VM.

To prepare a parent VM (e.g., a target VM), the parent VM is first powered-on and brought into a state from which the child VMs are desired to begin execution. For example, preparing includes bringing down network interfaces in the parent VM in preparation for an in-guest identity change. When the parent VM is ready to be forked, a user or script issues a command via a guest remote procedure call (RPC) to hypervisor 210 requesting the forking. The fork request, in some embodiments, is a synchronous RPC that returns only after the fork process has succeeded. Hypervisor 210 handles the guest RPC by quiescing the parent VM, halting its execution state, and marking all of the memory pages in the parent VM as COW. The memory and disk state of the parent VM are then ready for use by the child VMs. From the perspective of the parent VM, upon issuing the guest RPC, the parent VM is quiesced forevermore, never to run another instruction.

To prepare the child VM, the child VM is configured to leverage the existing memory, device, and disk state of the parent VM. To share the disk of the parent VM, the child VM is configured with a redo log pointing to the disk of the parent VM as the base disk of the child VM (e.g., similar to a linked clone VM). In addition, the child VM may be configured with its own dedicated storage that is not related to the parent VM. For example, the dedicated storage may include a data disk or access to shared storage if the child VM desires to persist state in storage other than its redo log.

A configuration file (e.g., .vmx file) associated with the child VM is updated to indicate that the child VM inherits the memory and device state of the parent VM upon power-on.

The configuration file may also be updated with additional information, such as a desired MAC address and IP address for the child VM. The configuration file is registered with the cloud operating system (e.g., executing on a host), and the child VM is ready to be powered-on on demand.

In some embodiments, the redo log of the child VM is marked as non-persistent. In such embodiments, upon each power-on, the child VM inherits a fresh copy of the memory, device, and disk state of the parent VM (e.g., re-forks from the quiesced image of the parent VM). In other embodiments, the redo log of the child VM is marked as persistent.

After preparation, the child VM is ready to be powered-on (e.g., spawned) upon receipt of a power-on request (e.g., from cloud service 302). In response to receipt of such a power-on request, the child VM inherits the memory and device state of parent VM template 310. As such, rather than performing a normal boot process, such as through the basic input output system (BIOS), the child VM instead resumes from the state of parent VM template 310. For example, the child VM inherits a COW reference to the memory state of the parent VM template 310. Referencing COW memory on the same host eliminates overhead for unmapped pages and results in a small overhead for mapped pages (e.g., less than one microsecond for four kilobyte pages), thus providing fast child VM instantiation.

Further, by referencing COW memory, the child VM is able to begin execution in a fraction of a second from the precise instruction (e.g., fork guest RPC) at which parent VM (from which parent VM template 310 was created) was quiesced. From the perspective of the child VM, the child VM sees the fork guest RPC returning successfully from hypervisor 210. The child VM may then be migrated away from parent VM template 310 without need for one-to-many migrations (e.g., one-to-many vMotion operations).

The child VM may then be customized. Customizing the child VM includes, for example, reading and applying a desired configuration state from the configuration file specified when preparing the child VM. As described herein, some embodiments customize the child VM by identifying and applying a MAC address, IP address, hostname, and other state to the child VM. Leveraging the customization data, the child VM may then spoof its MAC address to the desired MAC address, update its hostname, IP address, etc., and bring up its network interface. The child VM then continues execution as a unique VM (e.g., separate from parent VM) with its own identity.

Additional Examples

The following scenarios are merely exemplary and not intended to be limiting in any way.

In one scenario, an application programming interface (API) associated with cloud platform is updated to support aspects of the disclosure. For example, the same new clone API for forking is used to clone a full VM to enable all replica VMs 706 of the same host to share the same forked memory pages after power-on. The API may also be updated to query or verify that a parent VM is successfully in a forked state after power-on, to clone the child VM from a forked parent VM, and/or to promote linked clone VM to a full independent VM (e.g., remove fork identity from the forked VM).

In one example, customized clone VM 608 represents a linked clone VM having a small memory footprint (e.g., a delta disk of about fifteen megabytes). Further, in some embodiments, there is one such customized clone VM 608 for each of parent VM templates 310. Each of customized clone VMs 608 may spawn any quantity of the child VMs. In some embodiments, 2000 or more child VMs are spawned from each customized clone VM 608.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The embodiments illustrated and described herein as well as embodiments not specifically described herein but within the scope of aspects of the invention constitute exemplary means for configuring parent VM template 310 before instantiating child VMs therefrom to prevent rebooting the child VMs during customization. For example, one or more of the embodiments contemplate means for receiving, by computing device, a request to provision a plurality of desktop VMs, means for creating the clone VM from parent VM template 310 in response to the received request, means for attaching one or more disks to the created clone VM, means for customizing the clone VM to redirect data to the attached disks, means for instantiating the plurality of desktop VMs from customized clone VM 608, and means for applying a VM configuration to at least one of the instantiated plurality of desktop VMs without rebooting that desktop VM.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for configuring a parent virtual machine (VM) template before instantiating child VMs therefrom to prevent rebooting the child VMs during customization, said system comprising:
   memory associated with a computing device, said memory storing a plurality of parent VM templates; and
   a processor programmed to:
   receive, by the computing device, a request to provision a plurality of desktop VMs, the request identifying one of the plurality of parent VM templates;
   in response to the received request, create a clone VM from the identified parent VM template;
   attach one or more disks to the created clone VM;
   power on the clone VM with the attached one or more disks;
   customize the clone VM to redirect data to the attached disks;
   instantiate the plurality of desktop VMs from the customized clone VM; and
   apply a VM configuration to at least one of the instantiated plurality of desktop VMs without rebooting the at least one of the instantiated plurality of desktop VMs.

2. The system of claim 1, further comprising storage including a replica map that stores an assignment between each of a plurality of clone VMs and at least one of a plurality of target hosts.

3. The system of claim 2, wherein the processor is further programmed to update the replica map with an assignment between the customized clone VM and the target host.

4. The system of claim 3, wherein the processor is further programmed to:
   receive a request to provision another desktop VM, the request identifying one of the plurality of target hosts;
   select one of the plurality of clone VMs from the replica map based on the identified one of the plurality of target hosts; and
   instantiate the another desktop VM from the selected one of the plurality of clone VMs.

5. The system of claim 1, wherein the processor is further programmed to:
   quiesce the at least one of the instantiated plurality of desktop VMs; and
   create a checkpoint image of the quiesced desktop VM to enable a user to revert to the created checkpoint image at a subsequent time.

6. The system of claim 1, wherein the processor is further programmed to power on the clone VM after attaching the one or more disks and before customizing the clone VM.

7. The system of claim 1, wherein the processor is further programmed to reboot the clone VM one or more times during customization.

8. A method comprising:
   receiving, by a computing device, a request to provision a plurality of child virtual machines (VMs), the request identifying a parent VM template;
   in response to the received request, creating a clone VM from the parent VM template;
   applying, by the computing device, one or more customizations that prompt rebooting of the clone VM, wherein applying the one or more customizations comprises:
   attaching, by the computing device, one or more disks to the created clone VM before rebooting of the clone VM, rebooting the clone VM with the one or disks attached, and customizing the clone VM to redirect data to the attached disks;
   instantiating the plurality of child VMs from the customized clone VM; and
   applying a child VM configuration to at least one of the instantiated plurality of child VMs without rebooting the at least one of the instantiated plurality of child VMs.

9. The method of claim 8, further comprising partitioning and formatting the one or more disks.

10. The method of claim 8, further comprising assigning a mount point to each of the one or more disks.

11. The method of claim 8, wherein attaching the one or more disks comprises attaching a user data disk and a system disposable disk.

12. The method of claim 11, wherein customizing the clone VM to redirect data to the attached disks comprises redirecting user profile data to the user data disk and redirecting system temporary data to the system disposable disk.

13. The method of claim 8, further comprising:
monitoring for a reboot request during the applying of the one or more customizations; and
on detecting the reboot request, performing a reboot of the clone VM.

14. The method of claim 8, further comprising suspending the customized clone VM, and wherein instantiating the plurality of child VMs from the customized clone VM comprises forking each of the plurality of child VMs by:
defining, based on a virtual device state of the suspended clone VM, a virtual device state of the child VM; and
defining persistent storage for the child VM based on persistent storage of the suspended clone VM.

15. The method of claim 8, further comprising:
quiescing the at least one of the instantiated plurality of child VMs; and
creating a checkpoint image of the quiesced child VM to enable a user to revert to the created checkpoint image at a subsequent time.

16. One or more non-transitory computer-readable storage media including computer-executable instructions that, when executed, cause at least one processor to consolidate common customization before instantiating child virtual machines (VMs) using replicas, comprising:
receiving, by a computing device, a request to provision a plurality of child VMs, the request identifying a parent VM template and a target host;
in response to the received request, creating a clone VM from the parent VM template;
applying a first set of customizations to the created clone VM that prompt rebooting of the created clone VM, wherein the first set of customizations comprise attaching one or more disks to the created clone VM and powering on the customized clone VM with the attached one or more disks;
replicating the customized clone VM to a datastore accessible by the target host; and
instantiating the plurality of child VMs from the replicated VM stored in the datastore, wherein each of the instantiated plurality of child VMs powers on to perform a second set of customizations without rebooting.

17. The non-transitory computer storage media of claim 16, wherein each of the instantiated plurality of child VMs performs the second set of customizations by applying a child VM configuration without rebooting the child VM.

18. The non-transitory computer storage media of claim 16, wherein the computer-executable instructions further cause the processor to quiesce the replicated clone VM prior to instantiating the plurality of child VMs.

19. The non-transitory computer storage media of claim 16, wherein the computer-executable instructions cause the processor to replicate the customized clone VM to a plurality of datastores at the same time prior to instantiating the plurality of child VMs.

20. The non-transitory computer storage media of claim 19, wherein the computer-executable instructions further cause the processor to instantiate another child VM from a replica VM previously associated with the target host.

* * * * *